A. AKER.
Cultivator.
No. 225,264. Patented Mar. 9, 1880.
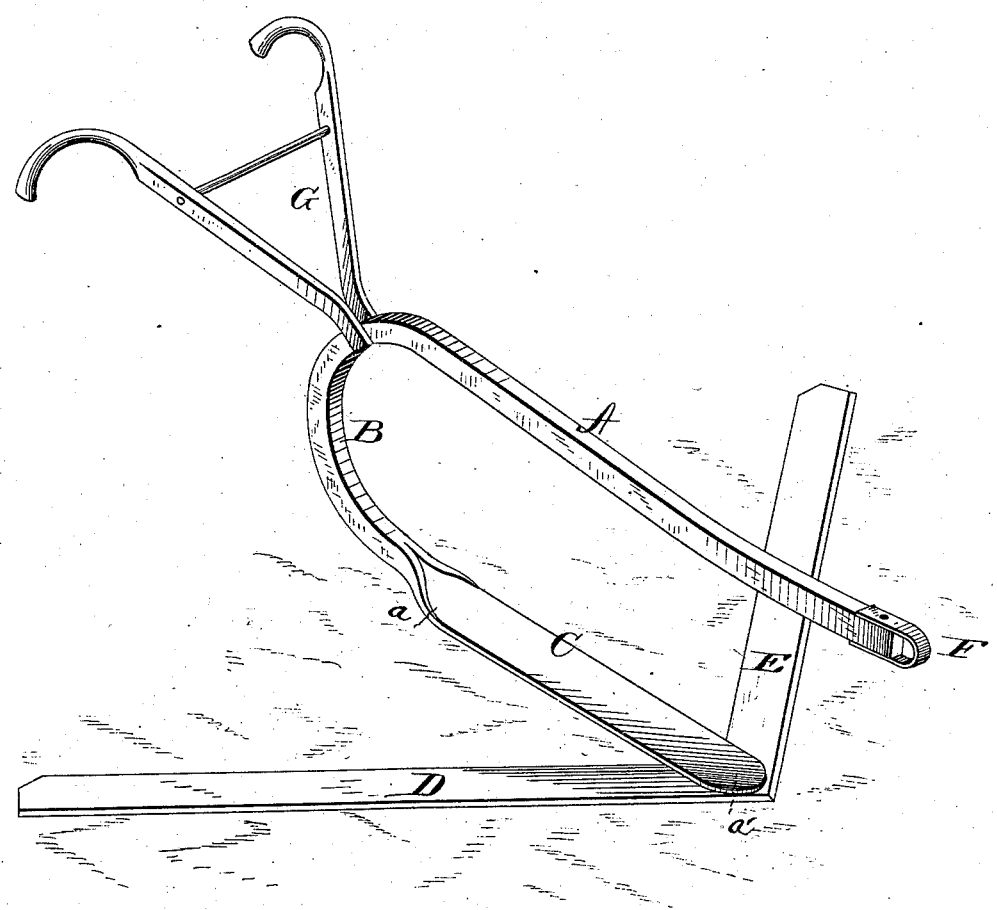
Witnesses:
Inventor:
Alfred Aker
by his attorney

UNITED STATES PATENT OFFICE.

ALFRED AKER, OF STREATOR, ILLINOIS, ASSIGNOR OF ONE-HALF OF HIS RIGHT TO JAMES G. WILSON, OF SAME PLACE.

CULTIVATOR.

SPECIFICATION forming part of Letters Patent No. 225,264, dated March 9, 1880.

Application filed January 26, 1880.

*To all whom it may concern:*

Be it known that I, ALFRED AKER, a citizen of the United States, residing at Streator, in the county of La Salle and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

This invention relates to that class of cultivators for growing crops planted in rows which are designed to run between the rows, and are provided with angularly-arranged flat knives or shares adapted to run just below the surface of the soil, so as to cut the roots of weeds and trash without turning the soil.

My improvement consists of such a root-cutting cultivator composed of a beam with a curved standard, which standard is extended forward in a horizontal direction and flattened so as to form a long horizontal flat sole, to the forward extremity of which the flat and angularly-arranged root-cutting knives or shares are secured.

The annexed drawing illustrates my improved cultivator in perspective.

The beam A is curved downward at the rear end to form the curved standard B. The cross-sectional contour of the beam is continued in the standard up to nearly its lowest point, $a$, where it is flattened out into a thin strap-like bar, C, which forms a long forwardly-projecting horizontal sole. The extreme forward end, $a'$, of this sole C reaches nearly as far forward as the beam A.

D and E refer to the root-cutting knives or shares, which are arranged at about a right angle to each other, diverging from the sole C, to the forward end of which they are secured.

These knives or shares are made of thin steel or iron with a steel edge, and are suitably ground to provide them with sharp cutting front edges. Their length should be such that they may nearly sweep the usual space between two rows of corn.

The knives are made of the usual width, affording broad bearing-surfaces, so that they may act in slicing fashion, and the sole C is of about the same width, in order to assist in steadying the action of the knives as well as of the whole implement.

The beam is provided with a clevis, F, and with handles G, as usual. By reason of the provision of the long flat sole intervening between the foot of the standard and the knives or shares, this root-cutting cultivator is better balanced, and can be more easily managed than cultivators of this kind as heretofore made, in which the knives or shares were attached directly to the foot of the standard of the beam. The long sole, moreover, forms an excellent guide for governing the penetration and direction of the knives or shares. Two of these root-cutters might be attached to a straddle-row cultivator-sulky and operated to cultivate on both sides of the straddled row.

What I claim as my invention, and desire to secure by Letters Patent, is—

The cultivator for cutting the roots of weeds, substantially as before specified, composed of a beam formed with a curved standard, which standard is flattened out from the point $a$ to the extreme end $a'$ into a flat horizontal sole, C, reaching about as far forward as the end of the beam, and flat knives or shares diverging from the extreme forward end of said sole.

In testimony whereof I affix my signature in presence of two witnesses.

ALFRED AKER.

Witnesses:
J. H. BURGESS,
NOAH WELCH.